April 25, 1961  R. E. WALKER  2,981,427
SPARE TIRE CARRIERS
Filed Jan. 5, 1959

INVENTOR
RONALD E. WALKER
BY— *Smart & Biggar*
ATTORNEYS

р
2,981,427
SPARE TIRE CARRIERS

Ronald E. Walker, Windsor, Ontario, Canada, assignor to Phil Wood Industries, Limited, Windsor, Ontario, Canada Filed Jan. 5, 1959, Ser. No. 784,973

2 Claims. (Cl. 214—451)

This invention relates to spare tire carriers and more particularly to a spare tire carrier of the type swingable between a transport position under the body of a vehicle and a loading or unloading position at the side or rear of the vehicle, the carrier having tire support means manually tiltable for lowering or raising a tire to or from the ground.

A spare tire carrier of the above type has already been proposed for use with automobiles having a rear bumper, the ordinary bumper being replaced by a special bumper adapted to be pivotally connected at one end and releasably connected at its other end to the chassis of the automobile and having a fixed rod extending from the middle of the bumper to serve as a support for a tiltable tire-carrying platform, means being provided for releasably anchoring the platform in position under the automobile to a cross-piece connected at its ends to the chassis. An obvious disadvantage of this prior proposal lies in the necessity for providing a special bumper, making the carrier unsuitable for incorporation in vehicles already provided with an ordinary bumper. Another disadvantage lies in the necessity of adapting the rear end of the chassis to receive the special bumper. Yet another disadvantage lies in the fact that the use of the previously proposed carrier is limited to automobiles having a rear bumper construction of some kind.

It is an object of the present invention to provide a spare tire carrier of the type described which does not suffer from the above disadvantages and is adaptable for incorporation in all types of vehicles, particularly heavy trucks, as it is in connection with heavy truck tires that the invention will best display its advantages.

According to the invention there is provided a spare tire carrier for a vehicle, comprising a bracket adapted to be secured to a side member of the chassis frame of the vehicle, a pivot shaft mounted substantially vertically on said bracket and extending below same, a substantially horizontal arm mounted on the lower end of said shaft so as to be swingable under the chassis frame and having a cylindrical portion, a tire-supporting cradle, a sleeve integral with said cradle and rotatably mounted on the cylindrical portion of said arm, cooperating locking means on said cylindrical portion and said sleeve to effect locking of the arm and the sleeve against relative rotation when desired, and anchoring means operable for releasably anchoring the spare tire carrier in position under the chassis frame.

The cooperating locking means referred to may be in the form of a pair of similar apertured lugs on the arm and sleeve, so arranged that the apertures are aligned when the tire cradle is horizontal and facing upwards, and a locking pin insertable through the aligned apertures for locking the lugs and hence the arm and sleeve against relative rotation.

An embodiment of the invention will now be described, by way of example, with reference to the accompanying drawings in which.

Figure 1:
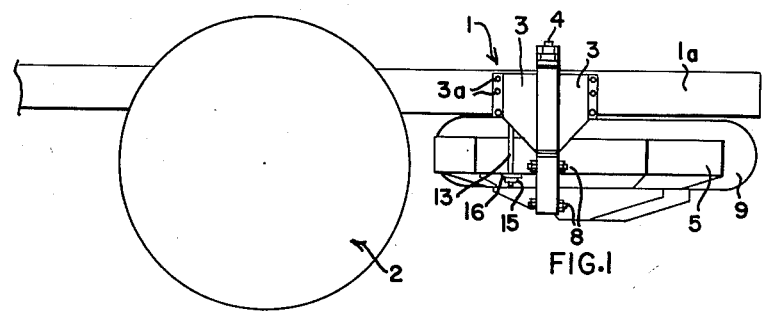
Figure 1 is a fragmentary schematic side elevation of a truck chassis having the spare tire carrier of the invention mounted thereon and in transport position.

As shown in the drawings, the spare tire carrier is mounted on an ordinary truck chassis frame 1 behind the rear wheels 2. The spare tire carrier consists of a bracket 3, bolted at 3a to a side member 1a of the frame 1, a pivot shaft 4 pivotally mounted on the bracket 3, and a tire cradle 5 incorporating a sleeve 6 rotatably mounted on a pivot arm assembly 7 secured to the lower end of pivot shaft 4 by bolts 8. Thus, arm 7, cradle 5 and a spare tire 9 carried thereby, may be swung on pivot shaft 4 to a position under the chassis frame 1, as shown in Figure 1, or may be swung out to the side of the vehicle, as shown in Figure 2.

Pivot arm assembly 7 has a cylindrical portion 7a limited by an outer collar and an inner collar, 7b and 7c respectively. The cradle sleeve 6 is rotatably mounted on the cylindrical portion 7a so that the cradle may be tilted from the horizontal position shown in Figure 1 to the inclined position shown in Figure 2. In this latter position a tire may be rolled along the ground into or out of the cradle 5, thus avoiding the necessity of lifting the tire up onto the cradle. With a tire on the cradle it is a relatively simple matter for one man to pivot the cradle back to the horizontal position for storage of the tire under the vehicle during transit.

Manually operable means are provided for locking the pivot arm 7 and sleeve 6 against relative rotation when the cradle 5 is in the horizontal position. Such means comprise an apertured lug 10 provided on the outer collar 7b of the arm 7 and extending radially downwards and a similar apertured lug 11 on sleeve 6, the lug 11 being mounted so that it also extends radially downwards when the cradle is in horizontal position and facing upwards. A locking pin 12 may be passed through the aligned apertures to lock the cradle in its horizontal position, as shown in Figure 3.

Figure 2:
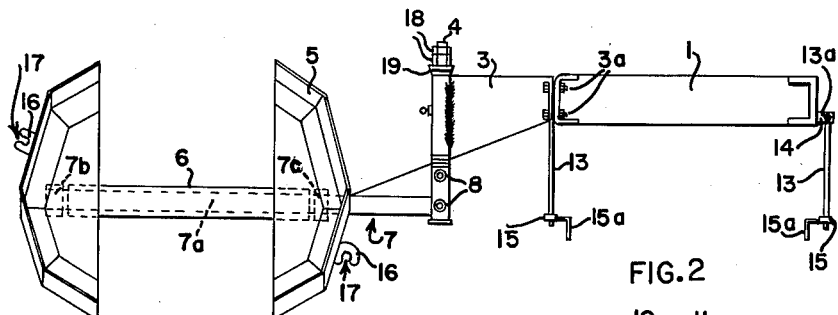
Figure 2 is a rear view corresponding to Fig. 1 but showing the tire carrier in loading or unloading position.
Figure 4:
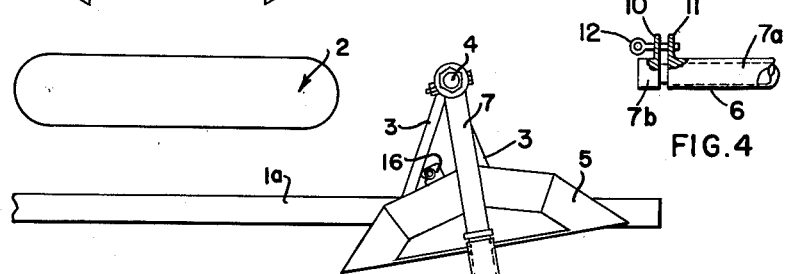
Figure 4 is a detail view showing the locking means.
Figure 3:
Figure 3 is an obverse plan view corresponding to Figure 1.
Figure 3:
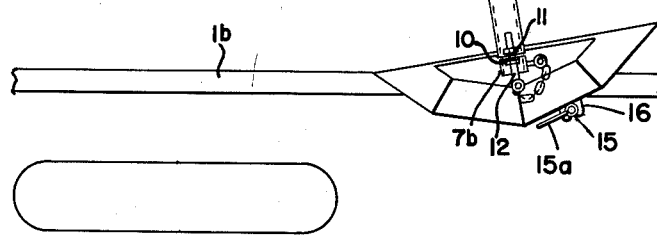

Means are also provided for anchoring the tire carrier in its transport position under the vehicle, illustrated in Figures 1 and 3. Such means comprise a pair of downwardly depending rods 13 swingably mounted as at 13a on brackets 14. One bracket 14 is bolted to side member 1b of the chassis frame 1 and the other bracket 14 may be bolted to side member 1a or to bracket 3. The lower ends of rods 13 are screw-threaded and carry nuts 15 adapted to be screwed up against slotted flanges 16 on the cradle 5, the rods 13 being insertable in the slots 17 of flanges 16. Thus, when the carrier is swung into the transport position, rods 13 are pivoted into slots 17 and nuts 15 are tightened against the lower faces of flanges 16 to take some of the weight of the tire and carrier and to prevent undesired movement of the carrier when the vehicle is moving. Nuts 15 may be provided with handles 15a to facilitate adjustment thereof without the use of tools.

Pivot shaft 4 is retained in position by nuts 18 screwed onto the top portion of the shaft 4 and engaging a thrust collar 19 at the top of bracket 3.

Using the spare tire carrier of the present invention one man may easily remove a spare tire from its transport position under the vehicle to replace a blown tire and return the tire carrier with the blown tire in position thereon to the desired location under the vehicle.

The spare tire carrier of the present invention may be mounted on an ordinary vehicle quite readily without altering the existing structure of the vehicle to any appreciable extent apart from providing suitably located holes in the chassis side members to receive the bolts for supporting the carrier.

What I claim as my invention is:

1. A spare tire carrier for a vehicle, comprising a bracket adapted to be secured to a side member of the chassis frame of the vehicle, a pivot shaft mounted substantially vertically on said bracket and extending below same, a substantially horizontal arm mounted on the lower end of said shaft so as to be swingable under the chassis frame and having a cylindrical portion, a tire-supporting cradle having side walls adapted to surround at least part of the periphery of a tire and a base adapted to overlap at least part of the near side of a tire placed in the cradle, a sleeve integral with said cradle and rotatably mounted on the cylindrical portion of said arm, cooperating locking means on said arm and said sleeve to effect locking of the arm and the sleeve against relative rotation when desired, and anchoring means operable for releasably anchoring the spare tire carrier in position under the chassis frame, said anchoring means comprising a pair of downwardly depending rods adapted to be swingably mounted at opposite sides of the chassis frame, a pair of slotted flanges extending from opposite sides of the tire cradle and adapted to receive said rods when the carrier is in transport position under the chassis, and nuts screwed on the ends of said rods and adjustable to engage the underside of said flanges.

2. A spare tire carrier as claimed in claim 1, in which said nuts are provided with handles to facilitate adjustment thereof without the use of tools.

References Cited in the file of this patent

UNITED STATES PATENTS

| | | |
|---|---|---|
| 1,800,309 | McCloud | Apr. 14, 1931 |
| 2,399,207 | Clark | Apr. 30, 1946 |
| 2,635,795 | White | Apr. 21, 1953 |
| 2,855,118 | Bliss | Oct. 7, 1958 |

FOREIGN PATENTS

| | | |
|---|---|---|
| 147,924 | Sweden | Nov. 30, 1954 |